United States Patent Office 2,865,772
Patented Dec. 23, 1958

2,865,772

LIGHTWEIGHT INSULATING FIREBRICK AND METHOD OF MANUFACTURE

Albert R. Lesar and Glen W. Charles, Mexico, Mo., assignors to A. P. Green Fire Brick Company, Mexico, Mo., a corporation of Missouri No Drawing. Application March 25, 1955
Serial No. 496,929

6 Claims. (Cl. 106—67)

The present invention relates generally to the refractory art and more particularly to a novel high temperature lightweight insulating firebrick and to the method of making it.

There are many different compositions of molded lightweight insulated firebrick and methods for making them. This type of brick is usually made by mixing an organic burn-out material such as sawdust and cork with a plastic fire clay, molding the mixture to shape, drying it, and then burning out the organic material from the shaped article so as to form a porous brick. Other methods which have been employed use a combination of air or gas bubbles with organic combustible material to produce the porous brick. However, it is very difficult to manufacture firebrick using these methods because the use of organic material such as sawdust and the like present many manufacturing problems during the molding, drying and burning operations. For example, organic material becomes spongy when wet and it cannot be readily pressed into shape. The usual method is to employ a soft mixture which deforms greatly in the drying and burning operation and because of this deformation it is necessary to make the initial blank much larger than the final desired brick or shape. Consequently, the final shape is obtained by grinding the crude blank to size. This of course is relatively expensive and results in a great waste of material, the amount of waste in some cases being as much as 50% of the volume of the desired finished brick or shape. Furthermore, brick made by the conventional method have high water content and the excess water must be removed by expensive drying processes. Also, unless the drying process is carried out very carefully, there will be high losses due to cracking of the bricks. In addition, in burning out the organic pore-forming material great care is required because in order to get a complete removal of this material it is necessary to fire the brick in an oxidizing atmosphere and follow relatively slow burning or firing schedules. If the firing is carried out in a reducing atmosphere, or if carried out too rapidly, the organic material will not be removed and the insulating properties of the brick will be destroyed.

In addition to the manufacturing problems encountered in making the conventional lightweight insulating firebrick, the brick must usually be limited to applications where the temperature does not exceed 2600° F. At temperatures above 2600° F. the known brick shrink and the pores close up causing the brick to lose their insulating qualities. Also, when this type of brick is used above 2600° F., it tends to vitrify and develope poor spalling or thermo shock resistance.

Therefore, it is a primary object of the present invention to provide a novel lightweight insulating firebrick and method, by means of which molded brick can be produced which have substantially no appreciable change in volume from the raw molded state to the fired state whereby there is very little, if any waste in achieving the desired final shape.

Another object is to provide a novel lightweight insulating refractory which can be used in insulations heated to 3200° F. More particularly, it is an object to provide insulating firebrick which possess high strength and retain their insulating characteristics when used as a furnace lining in furnaces which are operated at temperatures up to 3200° F.

Another object is to provide lightweight insulating firebrick which exhibit good spalling resistance and volume stability when used at temperatures up to 3200° F.

Briefly, the present invention comprises forming a stable non-shrinking refractory coating containing a binder around particles of low melting refractory material and compressing the material so that the particles are embedded in the highly refractory matrix whereby when the brick is fired the particles melt and cavities or pores are formed throughout the brick. In the preferred construction, the low melting refractory material is expanded perlite and the binder comprises a mixture of water soluble alumina-phosphate compounds such as mono-aluminum orthophosphate and di-aluminum orthophosphate.

We have found that a lightweight insulating firebrick of superior strength, volume stability, spalling resistance, and refractoriness can be produced by incorporating a low melting glassy material in a batch comprising finely ground calcined bauxite, finely ground 70% $Al_2O_3$ firebrick grog, finely ground raw kyanite, and a water soluble alumina binder.

Excellent bricks are obtained when the batch contains 16 to 20% expanded perlite, 35 to 67½% finely ground high purity calcined bauxite, 0 to 20% finely ground 70% $Al_2O_3$ firebrick breakage grog, 0 to 20% calcined flint fire clay or calcined kaolin, 5 to 15% finely ground raw kyanite, and 5 to 10% of a mixture of solution of mono-aluminum ortho-phosphate and di-aluminum orthophosphate, each containing approximately 50% solids. To this mixture is added 15 to 20% water, and the bricks are molded in a dry press and dried.

In the production of known insulating firebrick, the high drying and firing shrinkage, and the burning out of the combustible material limits the size of the piece which it is possible to manufacture. However, because of the ease of drying and firing the lightweight insulating firebrick which is the subject matter of the present invention, the limitation in the size of piece is governed by the size of the press cavity rather than by the mix composition. The bricks which we have produced exhibit good volume stability from the dried state to temperatures up to 3200° F. and it is not necessary to prefire them prior to use. Thus, they can be built into a furnace and fired in place. However, pre-burning to a temperature of between about 2300° F. to 2550° F. gives the brick a higher initial strength which is desirable for some applications.

The preferred low melting refractory material is expanded perlite which is a volcanic glass which contains a small amount of entrapped water. When the material is heated rapidly to temperatures of 1600° to 2000° F., it softens, and the water is changed to water vapor and endeavors to escape. In trying to escape, the water vapor forms bubbles so as to produce a porous cellular structure. In our work we have used perlite grains having a density of 8.4 to 8.9 pounds per cubic foot and have determined that 16 to 20% perlite, by weight, produces the best results. If it were possible to obtain a strong perlite grain having a density of less than 8.4 pounds per cubic foot, it would be desirable to use it. However, we have found that with the commercial perlites which are available, when the weight per cubic foot is less than 8.4 pounds, the grains are too soft and have a tendency to crush under ordinary brick forming techniques. When the perlite grains are crushed during the forming of the brick and before firing, maximum porosity is not achieved. Based on the use of perlite grains having the aforementioned density, if less than 16% perlite is used, there will not be enough pores in the brick and it will not meet finished weight specifications for lightweight insulating firebrick, which is approximately 55 ounces for 2800° F. brick and 70 ounces for 3200° F. brick. On the other hand, if more than 20% perlite is used, the glass content of the mix is so high that the brick will shrink during the manufacturing operation or after the brick are in service.

When the brick are in the unfired stage, the perlite is in the form of white glassy porous particles embedded in a gray colored refractory matrix. However, when the brick are burned, the particles (as such) disappear, and the refractory material (which has changed to a buff color) is honeycombed with small cavities or pores. The perlite melts without the matrix collapsing, and it is possible that the perlite reacts in some manner with the refractory material so as to cause it to maintain its form. When the fired brick are broken and are examined under a magnifying glass, one can see melted glassy material in the cavities or pores and throughout the brick.

The preferred refractory material for forming the coating (or matrix) comprises finely ground 70% alumina grog of high purity, finely ground high purity calcined bauxite, and finely ground raw kyanite. A calcined bauxite which has been found satisfactory has the following typical analysis: 85 to 88% $Al_2O_3$; 3 to 8% $SiO_2$; 1 to 5% $Fe_2O_3$; and 1 to 5% $TiO_2$. For best results, the combined iron oxide, titanium dioxide and impurities other than silica should not exceed 11%. The bauxite should be calcined to temperatures in excess of 2800° F. in order to pre-shrink it prior to use in the brick, and the flint fire clay should be calcined to approximately 2400° to 2600° F. The percentages of calcined bauxite, 70% alumina grog, calcined flint, and kyanite are selected so as to provide the brick with the desired properties. Manifestly, the calcined bauxite and the 70% alumina grog could be replaced in part (or all) by high alumina material such as fused alumina grains, fused mullite, sintered alumina, or calcined alumina but these materials are more expensive.

The main function of the kyanite is that it expands during the initial firing operation so as to offset any normal firing shrinkage of the other material. However, if too much kyanite is used, the resultant fired brick will have poor strength.

The refractory coating is caused to closely adhere to the porous glassy material by employing a water soluble non-fluxing refractory binder such as water soluble alumina phosphate compounds. The preferred binder compound is a mixture of water solution of mono-aluminum ortho-phosphate and di-aluminum ortho-phosphate, used in equal proportions. We have found that neither the mono- nor the di-aluminum ortho-phosphate gives all of the desired properties when used alone. Mixes using either one or the other are difficult to press into shape because of poor workability and the strength of the brick is also greatly reduced. This is particularly true of the dry strength, which is very necessary for the proper handling of the brick. It is necessary to use at least 5% (50% solution) of the binder compound in order to obtain satisfactory results. More than 10% can be used, but there is no apparent improvement, so that from the standpoint of economy and desired result, 10% is the determined maximum amount.

Aluminum sulphate can be used as a binder but the bricks are difficult to dry, and organic binders such as starch and dextrin are unsatisfactory because of drying shrinkage and the fact that they burn out at low temperatures.

The chemical analysis of mono-aluminum ortho-phosphate (50% solution) is: $P_2O_5$, 33.1%; $Al_2O_3$, 8.6%.

The chemical analysis of di-aluminum ortho-phosphate (50% solution) is: $P_2O_5$, 33.9%; $Al_2O_3$, 12.8%.

Another point which is important is that the brick should have a resultant alumina content within the range of 55 to 75%. If the alumina content is below 55%, the brick will not be refractory enough to withstand 2800° F. On the other hand, if the alumina content is above 75%, the brick will not exhibit volume stability and good spalling resistance.

An example of a brick suitable for application in a furnace operating at temperatures up to 3000° F. contains the following (expressed in terms of the dry batch):

| | Percent |
|---|---|
| Expanded perlite, 10 mesh | 18.5 |
| Calcined bauxite, 48 mesh | 55.5 |
| Calcined 70% $Al_2O_3$ grog, 48 mesh | 10.0 |
| Raw kyanite, 35 mesh | 5.0 |
| Raw kyanite, 100 mesh | 5.0 |
| Mono-aluminum ortho-phosphate (50% solids in water solution) | 3.0 |
| Di-aluminum ortho-phosphate (50% solids in water solution) | 3.0 |

In preparing the batch, the mono-aluminum and di-aluminum ortho-phosphate solutions are added with about 19% water (based on dry weight of total batch) to the expanded perlite particles. These materials are thoroughly mixed together in a tumble-type mixer and when the perlite, aluminum phosphate and water are thoroughly mixed, the remainder of the dry finely ground materials is added and the tumbling is continued until all of the materials are thoroughly mixed. Although it is not absolutely necessary to mix together the perlite and the binder before the refractory materials are added, it is highly desirable to do so because this procedure provides the perlite grains with a better coating of the refractory material, and it also prevents the mix from balling. The balling of the refractory materials in the wet mix destroys the uniform texture of the brick and it also produces a splotchy looking brick which destroys some of its scales appeal.

The tempered batch is then pressed into shapes on a conventional mechanical dry press or other suitable type of press so as to have the desired resultant density, and the shapes dried in a conventional drier. For a 2800° F. brick, the preferred resultant weight is about 56–60 pounds per cubic foot; for a 3000° F. brick the preferred weight is about 64–70 pounds; and for a 3200° F. brick the preferred weight is about 70–75 pounds. The dried insulating firebrick shapes may be installed in a furnace and fired in place, or they may be prefired in the same manner as ordinary fire clay brick shapes. If they are fired, the firing temperature should be in excess of 2200° F. to develop better strength. The optimum firing temperature is between 2300 and 2550° F. This firing temperature range is designated as the optimum range because there are certain applications where it is desirable that the brick contain no combined water, as well as no free water.

Chemically combined water is usually not all driven off until above 1000° F. Also, brick tend to lose some of their strength when the chemically combined water is driven off and they do not regain this strength until a ceramic bond is formed. Consequently, inasmuch as a good ceramic bond does not form in these particular brick below about 2200° F., the best firing temperature, taking all of the properties into consideration, will be between about 2300° F. and 2550° F., depending to some extent on the final mix composition.

These bricks may be fired to the proper burning temperature very rapidly because there is no combustible material (such as cork or sawdust) which has to be removed, and no shrinkage takes place in the firing operation. Because there is no drying or firing shrinkage when the shapes are burned at the proper temperature, the finished brick are accurate enough in size to meet rigid size specifications without any finish grinding being necessary.

When fired to this temperature range, brick containing the aforementioned percentages of ingredients exhibited the following physical properties:

| | |
|---|---|
| Wt. per 9" x 4½" x 2½" brick | 60–65 ounces. |
| Modulus of rupture | About 300 lb./sq. in. |
| 2950° F. reheat | No shrinkage. |
| 3000° F. panel preheat test (24 hrs.) | No shrinkage. |
| 2552° F. panel spalling test after the 3000° F. panel preheat test | No loss. |

The modulus of rupture test was conducted according to A. S. T. M. Designation C93–46 test for refractory materials (see A. S. T. M. Manual for Refractory Materials, p. 63, 1952.)

In the 2950° F. reheat test the furnace temperature reached 2950° F. in 5½ hours and was held at that temperature for 24 hours.

The 3000° F. panel preheat test and the 2552° F. panel spalling test were conducted according to A. S. T. M. Designation C122–47, p. 40–41 of A. S. T. M. Manual, 1952.

An example of a brick suitable for application in a furnace operating at temperatures up to 2800° F. contains the following:

| | Percent |
|---|---|
| Expanded perlite, 10 mesh | 18.5 |
| Calcined bauxite, 48 mesh | 37.5 |
| Calcined 70% alumina grog, 48 mesh | 18.0 |
| Calcined flint fire clay, 48 mesh | 15.0 |
| Raw kyanite, 100 mesh | 5.0 |
| Water solution of mono-aluminum orthophosphate, 50% solids | 3.0 |
| Water solution of di-aluminum orthophosphate, 50% solids | 3.0 |

The manufacturing procedure used in making this brick is the same as employed in the previously described brick which was suitable for use at temperatures up to 3000° F.

When fired in the temperature range of 2300 to 2550° F. these brick exhibit the following properties:

| | |
|---|---|
| Wt. per 9" x 4½" x 2½" brick | 54–56.5 ounces. |
| Modulus of rupture | About 250 lb./sq. in. |
| 2750° F. reheat | No shrinkage. |
| 2800° F. panel reheat | No shrinkage. |
| 2552° F. panel spalling test after the 2800° F. panel preheat test | Less than 1% loss. |

The modulus of rupture test was conducted according to A. S. T. M. Test Designation C93–46 for refractory materials.

In the 2750° F. reheat test the furnace was heated to 2750° F. in 4 hours and held at this temperature for 24 hours. The brick showed no shrinkage in this test. This test is according to A. S. T. M. Designation C210–46, p. 67, 1952, for group 28 insulating firebrick.

In the 2800° F. panel preheat, the test panel was built according to the method outlined in A. S. T. M. Designation C38–49, p. 32, 1952. The 2800° F. temperature was obtained in 4 hours and held at 2800° F. for 24 hours. After this test, the panel showed no joint shrinkage. This panel was then spalled at 2550° F. using A. S. T. M. panel spalling procedure C38–49, p. 36, 1952.

An example of a brick suitable for application in a furnace operating at temperatures up to 3200° F. contained the following:

| | Percent |
|---|---|
| Expanded perlite, 10 mesh | 18.5 |
| Calcined bauxite, 48 mesh | 65.5 |
| Kyanite, raw, 35 mesh | 5.0 |
| Kyanite, raw, 100 mesh | 5.0 |
| Mono-aluminum phosphate | 3.0 |
| Di-aluminum phosphate | 3.0 |
| Tempering water | 17.5 |

The manufacturing procedure used in making this brick is the same as employed in the previously described 2800° F. and 3000° F. insulating firebrick.

When fired in the temperature range of 2300 to 2550° F. this brick exhibits the following properties:

| | |
|---|---|
| Wt. per 9" x 4½" x 2½" brick | 67.5–70 oz. |
| Modulus of rupture | 500–600 lb./sq. in. |
| 3150° F. reheat | No shrinkage. |
| 3200° F. panel preheat | No shrinkage. |
| 2552° F. panel spalling test after 3200° F. panel preheat test | No loss. |

Another example of a brick suitable for use at temperatures up to 3200° F. contained the following:

| | Percent |
|---|---|
| Expanded perlite, 10 mesh | 16.0 |
| Calcined bauxite, 48 mesh | 67.5 |
| Kyanite, raw, 35 mesh | 11.5 |
| Aluminum phosphate solution | 5.0 |

The brick was pre-fired at about 2300° to 2550° F.

This brick exhibited the following properties:

| | |
|---|---|
| Wt. per 9" x 4½" x 2½" brick | 70 ozs. |
| Modulus of rupture | 500 p. s. i. |
| 3150° F. reheat | Less than 2% shr. |
| 3200° F. panel preheat | No shrinkage. |
| 2552° F. panel spalling test after 3200° F. panel preheat test | No loss. |

Another example of a brick suitable for use at temperatures up to 2800° F. contained the following:

| | Percent |
|---|---|
| Expanded perlite, 10 mesh | 20.0 |
| Calcined bauxite, 48 mesh | 35.0 |
| Calcined 70% alumina grog, 48 mesh | 10.0 |
| Calcined flint fire clay, 48 mesh | 20.0 |
| Raw kyanite, 100 mesh | 5.0 |
| Aluminum phosphate solution | 10.0 |

The brick was pre-fired at about 2300° to 2550° F.

This brick exhibited the following properties:

| | |
|---|---|
| Wt. per 9" x 4½" x 2½" brick | 54 ozs. |
| Modulus of rupture | 200 p. s. i. |
| 2750° F. reheat | Less than 2% shr. |
| 2800° F. panel preheat | No shrinkage. |
| 2552° F. panel spalling after the 2800° F. panel preheat test | Less than 1%. |

Another example of a brick suitable for use at temperatures up to 2800° F. contained the following:

| | Percent |
|---|---|
| Expanded perlite, 10 mesh | 18.5 |
| Calcined bauxite, 48 mesh | 37.5 |
| Calcined 70% alumina grog, 48 mesh | 20.0 |
| Calcined flint fire clay, 48 mesh | 3.0 |
| Raw kyanite, 100 mesh | 15.0 |
| Aluminum phosphate solution | 6.0 |

The brick was pre-fired at about 2300° to 2550° F.

This brick exhibited the following properties:

| | |
|---|---|
| Wt. 9" x 4½" x 2½" brick | 56 ozs. |
| Modulus of rupture | 190 p. s. i. |
| 2750° F. reheat | No shrinkage. |
| 2800° F. panel preheat | No shrinkage. |
| 2552° F. panel spalling after the 2800° F. panel preheat test | Less than 1%. |

Thus, it is apparent that there has been provided a novel high temperature lightweight insulating firebrick and method of making it, which fulfill all of the objects and advantages sought therefor. The resultant insulating firebrick has very little change in volume, if any, between the molded state and the fired state. Also, the brick possess high structural strength and can be used in installations which are heated up to 3200° F. without loss of insulating characteristics. In addition, even at temperatures of 3200° F., the brick exhibit good spalling resistance and volume stability.

It is to be understood that the foregoing description has been given only by way of illustration and example, and that changes and alterations in the present disclosure, which will be readily apparent to one skilled in the art, are contemplated as within the scope of the present invention, which is limited only by the claims which follow.

What is claimed is:

1. A lightweight insulating refractory consisting essentially of about 16–20% expanded perlite, about 35–67.5% calcined bauxite, about 5–15% raw kyanite, and about 2.5–5% water soluble aluminum phosphate binder.

2. A lightweight insulating refractory firebrick, consisting essentially of about 16–20% expanded perlite; about 35–67.5% calcined bauxite; about 0–20% firebrick grog; about 0–20% calcined flint fire clay; about 5–15% raw kyanite; and about 5–10% of a 50% solution of a water soluble aluminum compound selected from the group consisting of aluminum phosphates and aluminum sulphates.

3. A lightweight insulating refractory consisting essentially of about 16–20% expanded perlite; about 2.5–5% water soluble aluminum binder selected from the group consisting of aluminum phosphates and aluminum sulphates; about 0–20% calcined fire clay selected from the group consisting of calcined kaolin and calcined flint fire clay; about 5–15% raw kyanite; and about 55 to 75% high alumina refractory material selected from the group consisting of calcined bauxite, fused mullite, sintered alumina, calcined alumina, and calcined alumina grog.

4. The method of producing a lightweight insulating refractory, including the steps of mixing together about 16–20% expanded perlite particles and about 2½–5% of a water soluble aluminum compound binder selected from the group consisting of aluminum phosphates and aluminum sulphates so as to coat the particles with the binder; mixing therewith refractory material comprising about 0–20% calcined fire clay selected from the group consisting of calcined kaolin and calcined flint fire clay, about 5–15% raw kyanite, and about 55–75% high alumina material selected from the group consisting of calcined bauxite, fused mullite, sintered alumina, calcined alumina and calcined alumina grog; and compressing the mix to embed the perlite particles in the refractory matrix.

5. The method of producing a lightweight insulating refractory, including the steps of mixing together about 16–20% expanded perlite particles and about 2½–5% of a water soluble aluminum compound binder selected from the group consisting of aluminum phosphates and aluminum sulphates so as to coat the particles with the binder; mixing therewith refractory material comprising about 0–20% calcined fire clay selected from the group consisting of calcined kaolin and calcined flint fire clay, about 5–15% raw kyanite, and about 55–75% high alumina material selected from the group consisting of calcined bauxite, fused mullite, sintered alumina, calcined alumina and calcined alumina grog; compressing the mix to embed the perlite particles in the refractory matrix; and firing the brick to a temperature of about 2300°–2550° F. to cause the perlite to melt and form pores in the brick.

6. The method of producing a lightweight insulating refractory, including the steps of mixing together about 16–20% expanded perlite particles and about 2½–5% of a water soluble aluminum compound binder selected from the group consisting of aluminum phosphates and aluminum sulphates so as to coat the particles with the binder; mixing therewith refractory material comprising about 0–20% calcined fire clay selected from the group consisting of calcined kaolin and calcined flint fire clay, about 5–15% raw kyanite, and about 55–75% high alumina material selected from the group consisting of calcined bauxite, fused mullite, sintered alumina, calcined alumina and calcined alumina grog; pressing the material into bricks having a density of about 56–75 pounds per cubic foot; and firing the bricks to a temperature to cause the perlite to melt and form pores in the brick.

References Cited in the file of this patent
UNITED STATES PATENTS

| | | |
|---|---|---|
| 1,521,719 | Sherman | Jan. 6, 1925 |
| 2,207,992 | Steele | July 16, 1940 |
| 2,388,060 | Hicks | Oct. 30, 1945 |
| 2,630,310 | Harshberger | Mar. 3, 1953 |
| 2,702,752 | Parsons | Feb. 22, 1955 |